(No Model.)
J. SMALLEY, Dec'd.
W. W. SMALLEY, administrator.
ANTI-FRICTION COMPOSITION.
No. 300,023. Patented June 10, 1884.
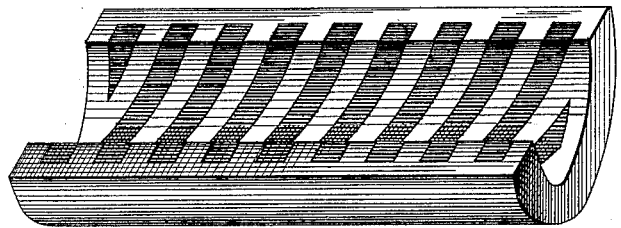

UNITED STATES PATENT OFFICE.

WILLIAM W. SMALLEY, OF BOUNDBROOK, NEW JERSEY, (ADMINISTRATOR OF JOHN SMALLEY, DECEASED,) ASSIGNOR TO THE GRAPHITE LUBRICATING COMPANY, OF JERSEY CITY, NEW JERSEY.

ANTI-FRICTION COMPOSITION.

SPECIFICATION forming part of Letters Patent No. 300,023, dated June 10, 1884.

Application filed March 6, 1884. (No specimens.)

*To all whom it may concern:*

Be it known that JOHN SMALLEY, deceased, late a citizen of the United States, and a resident of Boundbrook, in the county of Somerset and State of New Jersey, did invent certain new and useful Improvements in Anti-Friction Compositions, of which the following is a specification.

This invention relates to compositions such as are employed for bearings to reduce friction and dispense with or economize the use of oils or other lubricants; and the invention consists of a composition of such ingredients as will insure great tenacity and durability, and enable the compound, by slight variations in proportions, to be adapted to various purposes or to varying circumstances.

The improved composition consists, essentially, of a mixture of graphite, shellac, and gum-copal, which composition has been found to be adapted to very many purposes and situations. In making the said composition, heat or a suitable solvent or solvents is used for the shellac and copal, and the ingredients are combined in any suitable manner; but it is preferred to make two compositions—one containing shellac and graphite, the other of gum-copal and graphite—and to then combine the same in the desired proportion for the purpose intended. The shellac composition is made by dissolving, say, twenty-five parts, by weight, of shellac into alcohol, and stirring in seventy-five parts of graphite, or by fusing the shellac and combining the graphite therewith, forming a dough-like composition, which is spread, dried, and pulverized, preferably ground to a fine powder in a mill. The copal composition is made by softening pulverized gum-copal in turpentine and adding sufficient alcohol to effect a solution, taking, say, one pint of turpentine to six pounds of copal, and adding alcohol in sufficient quantities to dissolve all the gum-copal. Graphite is then mixed with the solution in sufficient quantities—preferably seventy-five parts of graphite and twenty-five parts gum-copal—so as to make a paste, which is dried and powdered, as before stated for the shellac composition. The preliminary treatment of the gum-copal with turpentine has proved to be a most important and valuable step, as thereby a quicker, stronger, and more effective solution of the gum is secured than by acting upon it with alcohol alone. The two powders are combined in suitable proportions and forced in the grooves, recesses, or receptacles of boxes, as with other lubricating compositions.

The figure in the drawing is a perspective view of the lower half of a journal-bearing, with the composition packed in diagonal or inclined grooves; but hollow pockets or longitudinal or transverse grooves, or any other form of receptacle, might be used.

The proportions in which the two powders are combined will depend upon the character of lubricating material desired. Thus, where there is heavy pressure on the bearing likely to result in excessive friction, the proportion of gum-copal is increased, which adds to the density and durability of the mixture. When the pressure is light and speed greater with increased liability of heating, more shellac is used. The special feature of this composition is the use of the gum-copal in connection with the plumbago and shellac, whereby a most tenacious and durable anti-friction composition is secured, which is adapted for use with all classes of bushings and bearings—as vehicles and car-boxes, axle-boxes, steps, thrust-bearings, and loose pulleys, slides, cross-heads, &c.—and which may be employed in many instances without the use of oil.

If desired, the composition may be formed into blocks or sheets, alone or combined with fabrics or fibers, and all the ingredients may be put together at once, instead of making two different compositions and combining them.

A good proportion in mixing these substances is found to be sixty-six and two-thirds ($66\frac{2}{3}$) parts of the shellac and graphite composition and thirty-three and one-third ($33\frac{1}{3}$) parts of the copal and graphite composition.

A journal-bearing composition consisting of plumbago and shellac has been successfully used for many purposes; but it has been found that this improved composition is better in many respects, and is susceptible to more general use, as the composition can be better adapted to the special purpose for which it is intended.

Without limiting the invention to any special proportion of ingredients, what is claimed is—

1. A composition for anti-friction bearings, consisting of graphite, shellac, and gum-copal, combined substantially as herein set forth.

2. In the manufacture of lubricating compositions, subjecting gum-copal to the action of turpentine, and then dissolving in alcohol, combining with graphite, drying, and pulverizing, to form an anti-friction powder.

3. The improvement in making anti-friction compositions, consisting in combining graphite with a solution of shellac, and drying and powdering the mixture, and combining the powder with another made by mixing graphite with a solution of gum-copal, and drying and pulverizing the same, substantially as set forth.

In testimony whereof I have signed my name to this specification in the presence of two subscribing witnesses.

WILLIAM W. SMALLEY,
*Administrator of John Smalley, deceased.*

Witnesses:
A. W. VAN WINKLE, Jr.,
SPENCER WEART.